United States Patent [19]

Goel

[11] Patent Number: 4,737,572
[45] Date of Patent: Apr. 12, 1988

[54] POLY(AMIDE-ESTER-THIOETHER) CONTAINING THERMOSET POLYMERIC COMPOSITION FROM REACTION OF BISOXAZOLINE WITH COMPOUND CONTAINING BOTH THIOL AND CARBOXYLIC ACID GROUPS

[75] Inventor: Anil B. Goel, Worthington, Ohio

[73] Assignee: Ashland Oil, Inc., Ashland, Ky.

[21] Appl. No.: 944,108

[22] Filed: Dec. 22, 1986

[51] Int. Cl.$^4$ .................... C08G 63/00; C08G 65/00; C08G 69/00
[52] U.S. Cl. .................... 528/360; 528/363; 528/374
[58] Field of Search .................... 528/360, 363, 374

[56] References Cited

U.S. PATENT DOCUMENTS 3,696,395  2/1972  Tomalia .................... 528/374
3,746,691  7/1973  Tomalia et al. .................... 528/374

Primary Examiner—Harold D. Anderson
Attorney, Agent, or Firm—John F. Jones

[57] ABSTRACT

A process for preparing thermoset polymers at an improved rate by copolymerizing a bisoxazoline with a compound having both thiol and carboxylic acid groups in the presence of a catalytic amount of an alkali metal or an alkaline earth metal cationic complex of formula $MX_n$ wherein M represents lithium, potassium, sodium, magnesium, calcium or zinc, X represents $BF_4$, $BPh_4$, $ClO_4$, $PF_6$, $SbF_6$ or $AsF_6$ is described.

8 Claims, No Drawings

POLY(AMIDE-ESTER-THIOETHER) CONTAINING THERMOSET POLYMERIC COMPOSITION FROM REACTION OF BISOXAZOLINE WITH COMPOUND CONTAINING BOTH THIOL AND CARBOXYLIC ACID GROUPS

The present invention relates to an improved process for the preparation of thermoset polymers from bisoxazolines and compounds containing both thiol and carboxylic acid groups in the same molecule by use of an alkali metal or alkaline earth metal cationic complex as catalyst.

The reaction of bisoxazolines with polythiols (also called polymercaptans) and with polycarboxylic acids to give thermoplastic or thermoset polymers has been described in U.S. Pat. No. 3,639,395. The prior art reaction has been found to be quite slow requiring much higher reaction temperatures (greater than 150° C.) and several minutes to hours for the reaction to go to completion. The reaction of polycarboxylic acids with bisoxazolines in the presence of cationic complex catalysts has been described in copending U.S. patent application Ser. No. 765,536, filed 8/15/85 now U.S. Pat. No. 4,644,052.

Usually in the process of this invention, the reactions reach to near completion to given infusible products within a few minutes at moderately elevated temperatures, preferably from about 100° to 200° C.

I have discovered an improved process having much improved reaction rates for forming thermoset polymeric products by carrying out the reaction of bisoxazolines with compounds containing both thiol (mercaptan) groups and carboxylic acid groups in the same molecule in the presence of from about 0.1 to about 5% by weight based on the weight of other ingredients of a catalyst of the formula $MX_n$, wherein M represents lithium, potassium, sodium magnesium, calcium, or zinc, X represents $BF_4$, $B(phenyl)_4$, $ClO_4$, $PF_6$, $SbF_6$, or $AsF_6$ and n represents 1 or 2 and wherein Ph represents a phenyl group.

The bisoxazolines useful in the present invention include those having the formula

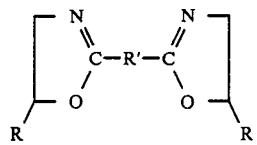

wherein R represents hydrogen, an alkyl group or hydroxy alkyl group having from 1 to 10 carbon atoms and R' represents an alkylene group having from 2 to 20 carbon atoms, an arylene group having from 6 to 12 carbon atoms or an alkarylene group having from 7 to 20 carbon atoms.

The compounds containing at least one thiol and at least one carboxylic acid group per molecule useful in this invention include mercapto alkanoic acids such as mercaptoacetic acid, thioglycollic acid, mercaptopropionic acid, thiolactic acid, thio malic acid, thio benzoic acid and the like.

In my process, reaction in the presence of the catalyst of this invention produces infusible thermoset polymers possibly indicating the cross-linking by partial bisoxazoline homopolymerization as reported in earlier copending U.S. patent application Ser. No. 765,634, filed 8/15/85, now U.S. Pat. No. 4,658,011. Reactive additives such as polyepoxide resins may be included in the polymerization reactions of this invention. The resins produced by the process of this invention may also be filled with fillers and reinforcement fibers and other materials known to those in the art. The rapid setting thermoset compositions of this invention may be used in applications such as adhesives, coatings, reaction injection molding (RIM) for structural materials such as auto parts and the like.

This invention is further illustrated in the following representative examples.

EXAMPLE 1

A bisoxazoline (in the foregoing formula R is hydrogen and R' is a 1,3-phenylene group) (3 g), 0.5 g of thiopropionic acid and 0.3 g of lithium fluoborate were mixed in an aluminum dish and the mixture was heated at 170° C. The mixture gelled within two minutes under these conditions to give an infusible, thermoset polymer. The polymer was postcured at 165° C. for 30 minutes and the resulting polymer was found to have a Tg by differential scanning calorimetry (DSC) of 172° C. and a 5% weight loss in nitrogen by thermal gravimetric analysis (TGA) at 356° C.

EXAMPLE 2

The procedure of Example 1 was followed using 2.5 g of bisoxazoline, 1 g of the liquid diglycidyl ether of Bisphenol-A (epoxy equivalent weight of 185), 0.5 g of thiopropionic acid and 0.03 g of lithium fluoborate catalyst. The reaction mixture upon heating at 170° C. gelled to give an infusible thermoset polymer within 1.6 minutes. The polymer was then postcured at 165° C. for 30 minutes. The final polymer was found to be insoluble in dimethyl formamide and N-methylpyrrolidone and had a Tg by DSC of 182° C. The 5% weight loss of the polymer by TGA under nitrogen atmosphere occurred at 313° C.

EXAMPLE 3

The procedure of Example 1 was followed using 2 g of the bisoxazoline, 1 g of a bis oxazoline (in the foregoing formula R is hydrogen and R' is a 1,4-phenylene group), 0.5 g of thiopropionic acid and 0.03 g of lithium fluoborate and heating the reaction mixture at 170° C. Gelation occurred in 1.7 minutes to give a thermoset polymer. The polyme was postcured to 170° C. for 30 minutes and the resulting product was found to have a 5% weight loss by TGA under nitrogen atmosphere at 320° C.

I claim:

1. An improved process for the preparation of thermoset polymers comprising copolymerizing a bisoxazoline having the formula

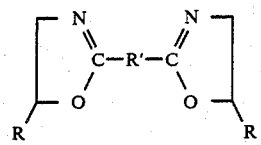

wherein R represents hydrogen, an alkyl group or hydroxy alkyl group having from 1 to 10 carbon atoms and R' represents an alkylene group having from 2 to 20 carbon atoms, an arylene group having from 6 to 12 carbon atoms or an alkarylene group having from 7 to 20 carbon atoms with a compound containing at least one thiol group and at least one carboxylic acid group per molecule in the presence of a catalytic amount of a metal cationic complex having the formula $MX_n$ wherein M represents lithium, potassium, sodium, magnesium, calcium or zinc, X represents $BF_4$, $B(phenyl)_4$, $ClO_4$, $PF_6$, $SbF_6$ or $AsF_6$ and n represents 1 or 2.

2. The process of claim 1 carried out at a temperature in the range of from about 100° C. to abut 200° C.

3. The process of claim 2 wherein the compound having both thiol and carboxylic acid groups is a mercapto alkanoic acid.

4. The process of claim 3 wherein the metal cationic complex is present in from about 0.1 to about 5% by weight based on the other ingredients.

5. The process of claim 4 wherein the bisoxazoline is one in which R is hydrogen and R' is a 1,3-phenylene group.

6. The process of claim 4 wherein the bisoxazoline in which R represents hydrogen and R' represents a 1,4-phenylene group.

7. The process of claim 5 wherein the mercapto alkanoic acid is thiopropionic acid and the metal cationic complex is lithium fluoborate.

8. The process of example 3 wherein the mercapto alkanoic acid is thiopropionic acid and the metal cationic complex is lithium fluoborate.

* * * * *